US005150782A

United States Patent [19]

Richter

[11] Patent Number: 5,150,782

[45] Date of Patent: Sep. 29, 1992

[54] DEVICE FOR POSITIONING BOTTLES SYMMETRICALLY TO THE ROTATIONAL AXES OF BOTTLE CARRIAGES IN LABELING MACHINES AND THE LIKE

[75] Inventor: Stefan Richter, Regensburg, Fed. Rep. of Germany

[73] Assignee: Krones AG Hermann Kronseder Maschinenfabrik, Neutraubling, Fed. Rep. of Germany

[21] Appl. No.: 710,794

[22] Filed: Jun. 5, 1991

[30] Foreign Application Priority Data

Jun. 6, 1990 [DE] Fed. Rep. of Germany ... 9006376[U]

[51] Int. Cl.[5] ............ B65G 47/24
[52] U.S. Cl. ............ 198/394; 198/379
[58] Field of Search ............ 198/385, 394, 400, 411, 198/379, 380, 377, 378

[56] References Cited

U.S. PATENT DOCUMENTS

| | | | |
|---|---|---|---|
| 2,968,387 | 1/1961 | Lagler | 198/394 X |
| 3,527,334 | 9/1970 | Wideman | 198/394 X |
| 4,143,754 | 3/1979 | Eldred | 198/394 X |
| 4,280,612 | 7/1981 | Nagano | 198/394 X |
| 4,497,409 | 2/1985 | Chong | 198/394 X |
| 4,529,469 | 7/1985 | Jorss | 198/394 X |
| 4,911,285 | 3/1990 | Rogall et al. | 198/377 X |

FOREIGN PATENT DOCUMENTS

| | | | |
|---|---|---|---|
| 0221020 | 9/1990 | Japan | 198/394 |

*Primary Examiner*—Robert P. Olszewski
*Assistant Examiner*—James R. Bidwell
*Attorney, Agent, or Firm*—Fuller, Ryan, Hohenfeldt & Kees

[57] ABSTRACT

Bottles which have a central conical recess and a radially extending groove in their bottom are transported on carriages with a rotary table which carries vertical circumferentially spaced apart shafts 7 through a closed orbital path. A mounting plate 37 fastens to each shaft 7 and has an upwardly extending journal 36 concentric to the shaft. A flange bushing 58 rotates on the journal and sleeve 57 is pressed concentrically on the bushing and roates thereon. The upper end of the sleeve 57 has a truncated conical centering element 22 fastened to it. A bottle support disk 23 has a central hole which is concentric to the conical centering element 22. A frictionally driven wheel 17 is fastened to sleeve 57. A ring plate underneath bottle support ring 23 is fastened to support plate 24 and carries a spring 22 which presses an alignment element 9 upwardly toward the bottom of a bottle on the support ring 23. A translating friction belt 13 engages the friction wheel 17 as the device passes through an alignment zone 18 to cause the conical centering element to rotate the bottle until alignment element 9 registers in groove 16 to effect a predetermined angular position of the bottle.

11 Claims, 3 Drawing Sheets

DEVICE FOR POSITIONING BOTTLES SYMMETRICALLY TO THE ROTATIONAL AXES OF BOTTLE CARRIAGES IN LABELING MACHINES AND THE LIKE

BACKGROUND OF THE INVENTION

The invention disclosed herein pertains to a device for positioning bottles symmetrically to the rotational axis of bottle carriages in labeling machines and the like wherein the bottle is rotated about a vertical axis when a label is being applied.

German Patent DE-PS 2419133 discloses a device for aligning and centering cylindrically shaped bottles which have a central depression or recess at their bottoms that provides for achieving alignment and centering of the bottle with an axis of rotation on a bottle carriage. In this device the bottles are centered by reason of a cone registering in the recess. Bottles which have this recess can be centered and aligned in preparation for having a label applied to them while they were rotating independently of their outer contour and shape. Devices designed in this manner are preferred for labeling machines which must be capable of processing numerous containers of varying shapes without requiring time-consuming changeover work. It is not unusual for machines which are used to fill bottles with alcoholic beverages must be capable of handling up to 10 or more different types of bottles.

It is conventional practice to align the bottles on their center of rotation, during passage of the bottles through an alignment zone, by means of a vertically controllable centering cone which lifts the bottles slightly and rotates them until an alignment lug becomes engaged with the bottle. Rotation of the bottle can be accomplished by means of a frictional surface that acts directly on the periphery of the bottles or by means of a friction drive wheel that acts on and rotates the centering cone. In this known apparatus, problems can occur while the machine is operating partly as a result of the considerable difference in the dimensional tolerances of bottles and also as a result of the bottles having wet surfaces so that proper alignment and centering is not carried out in all cases. A further disadvantage in prior devices is that the frictional surface for driving the bottle depends on the shape of the bottle; that is, the frictional driving element must be exchanged when there is a change in bottles which have different shapes or sizes. A further disadvantage is that the frictional driving systems used in prior art bottle carriages exert lateral forces on the center bottles which is undesirable.

The control mechanism for moving the centering cone vertically is very expensive to construct and is considered disadvantageous because very little space is available in the rotary table which orbits the bottles as they pass a station at which a label is applied to a rotating bottle. This is especially true in arrangements wherein the centering cone is driven rotationally by an auxiliary friction belt that is arranged under the rotary table.

SUMMARY OF THE INVENTION

According to the invention, the bottles are moved on a rotatable table through an orbital path which begins in a zone wherein the bottles are centered and aligned with the rotational axes of the carriages which support them. After alignment is obtained, the rotatable table orbits the bottle supporting carriages to proximity with a station at which a label is applied to the bottle while it may or may not be rotating about its axis. The bottle carriage is connected with its control mechanism in the rotatable table and the carriage has at least one lateral recess by which a frictional drive wheel or drum in the carriage is presented to a rotating closed loop belt in the centering and aligning zone. The frictional belt surface engages and rotates the elements in the moving carriages which bring about rotation and centering of the bottles on the respective carriages. The required alignment rotation of the bottle is achieved without the requirement of any complicated gear drive mechanisms which would have to be lodged in the rotating table and which would make alteration of the control arrangement unavoidable. Instead, according to the invention, the rotational alignment motion of the centering cone can be generated by means of the closed loop friction belt which is adjacent and in proximity with the rotary table. To achieve this, a friction wheel in the carriage which supports the bottle presents its periphery towards the friction belt and is maintained in a stationary position relative to the rotary table by means of the control mechanism in the carriage during passage of the bottle through the alignment zone.

In a carriage, a bottle is supported on a plate which is translated in an orbital fashion with the rotary table and it is particularly desirable for the friction drive belt which extends into a lateral recess of the carriage to be arranged on the radially outward side of the orbital path of the bottle supporting plate in the carriage. Although a rotating friction wheel could be used to rotate the bottle supporting plate, the more desirable flexible belt not only permits attachment to the frame of the rotary table housing, but also permits use of an endless belt which can run on pulleys, one of which is driven rotationally. It is easy to drive the belt drum that is correlated with the bottle supporting plate in the direction in which the plate is transported or in an opposite direction, as desired. Availability of the possibility of driving the bottle supporting plate rotationally in either direction of rotation is advantageous in that it provides for a maximum number of alignment rotations of the bottle, whose mouth is engaged by a conventional centering cone while passing through a centering and alignment zone of limited length. Thus, if the engagement of the spring biased lug or alignment element with the bottle has not occurred during the first rotation thereof, engagement is certain to take place during a second or third rotation.

In the bottle carriages, according to the invention, it is not necessary to elevate the centering cone so no separate vertical control mechanism for the cone is necessary. This is achieved as a result of the upper side of the plate which supports the bottle at its bottom having a stand-ring, which can be moved vertically, that is, which can be guided so as to be axially displaced in the direction of the axis of rotation of the bottle supporting plate. Hence, when the stand-ring is unloaded, it is acted upon by a spring and assumes an upper stopped position where the support surface for the bottle projects beyond the upper end of the centering element which is typically in the form of a truncated cone which is shaped complementarily to a conical recess in the bottom of the bottle. The cam controlled centering bell which is normally present in bottle handling machines, such as bottle filling and labeling machines, is driven down to grip the bottle by its mouth to stabilize the bottle when it is undergoing rotation. In accordance with the invention, immediately after a bottle has been pushed onto the bottle supporting plate in the carriage, the bottom of the bottle presses down on the spring loaded stand-ring to the extent that the conical recess in the bottom of the bottle receives the truncated cone-shaped centering element. At this time the lowering movement of the bottle is arrested. This can be accomplished easily since the vertical control arrangement of the centering bell is normally equipped with a compensator spring that compensates or self-adjusts for vessel height tolerances. During the previously mentioned lowering procedure of the centering bell, the alignment element which is also spring loaded makes contact with the bottom of the vessel and is lowered by it as is the stand-ring so that a compression spring continually presses the alignment element against the bottom of the vessel as the element is seeking to enter or latch into a groove in the bottle bottom.

The compression rings which resist downward movement of the stand-ring have an inherent counter compression force such that the friction between the stand-ring and the part of the bottle bottom surface that makes contact with it is overcome more easily than the friction between the conical recess in the bottom of the bottle and the centering cone, so that the bottle is rotated during passage through the alignment zone by means of the rotationally driven truncated cone-shaped centering element despite the fact that the stand-ring is stationary. It is to be noted that slippage occurs between the bottom of the bottle and the stand-ring until the spring biased alignment element is able to engage in the corresponding radially extending groove in the bottle bottom in which case the need for further rotation of the bottle during the alignment phase is not necessary.

As the carriage with the bottle on it progresses through the remainder of the alignment zone, the bottle bottom slips rotationally on the truncated cone-shaped centering element. There can also be slippage between the friction bodies that are rotationally fixed with it and are arranged in a hollow belt access space in the carriage.

In accordance with the invention, after the carriage and bottle thereon passes through the centering and aligning zone, it is necessary to begin transferring torque from the plate control of the bottle for the purpose of continuing to rotate the bottle without unlocking it from the elements which rotated it sufficiently for effecting centering and alignment. For instance, the bottle must be driven rotationally when it is having a label applied to it. Thus, immediately prior to the bottle leaving the orbitally moving bottle carriage on the rotating table, the centering bell that presses the bottle against the bottle support plate is raised by means of its own control mechanism so that the springs that act on the underside of the stand-ring are in a position to move the stand-ring into its upper stopped position whereupon the bottle is raised off of the centering cone and the alignment element and is pulled away from the support plate.

An illustrative embodiment of the invention will be described now in greater detail in reference to the drawings.

DESCRIPTION OF A PREFERRED EMBODIMENT

Figure 1:
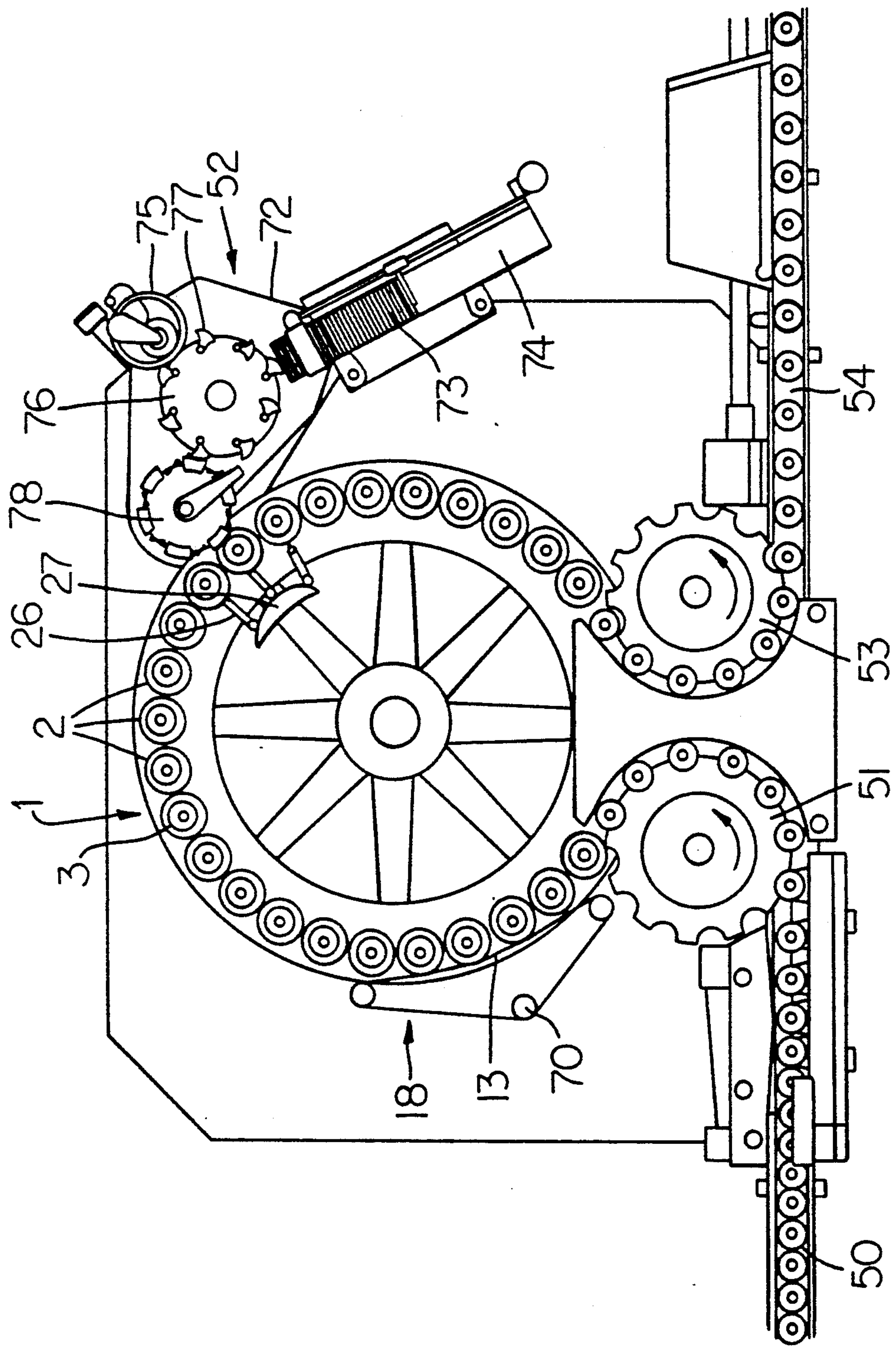
FIG. 1 is a schematic plan view of a machine including a rotary table on which there are bottle handling carriages, the illustrative machine being a bottle labeling machine.

The bottle processing machine selected for illustrating the invention is a labeling machine which is illustrated schematically in FIG. 1. The machine includes a rotary table 1. Bottles are fed into the machine from a conveyor 50 which inserts them in an infeed starwheel 51. Starwheel 51 rotates in the direction indicated by the arrow thereon. Immediately after the bottles are discharged from the pockets of the starwheel 51 they arrive at a bottle centering and aligning zone which is generally designated by the numeral 18. In the alignment and centering zone 18 there are three rollers or pulleys 70. At least one of these rollers is driven rotationally. A closed loop belt 13 runs on the rollers and presents a long part of the belt loop toward the bottle carriages 2 on the rotary table 1. Belt 13 is used to bring about rotation of the bottle during the step of centering and aligning the bottle appropriately in respect to its center of rotation as will be explained in detail momentarily. Assuming that there is a bottle standing on every carriage 2 as the bottles enter the centering and aligning zone 18, each bottle would be engaged at its top by a conventional centering bell, not shown, which is driven down to engage the mouth of the bottle and to stabilize the bottle and yet permit its rotation about its vertical axis. Centering bells are practically always used in apparatus of this kind to stabilize bottles so it is hardly necessary to depict or describe them. The centering bell clamps the bottle with a downward force. Alignment of the bottle takes place while it is passing through the alignment and centering zone 18 after which the bottle assumes a position at the labeling station 52, in this example, as it continues on its way. At labeling station 52 a label is applied to the vessel in a conventional way. The labeling device 52 includes a base 72. A stack of labels 73 are stored in a label magazine 74. There is a rotationally driven turret 76 which is proximate to the leading label in the magazine 73. The turret has a plurality of pallets 77 adapted to swing or oscillate on it. As the pallets pass a glue roller 75 they become coated with glue. Due to clockwise rotation of turret 76, the pallet 77 pick up by adhesion a label from magazine 74 and transport it to a pickup wheel 78 where the label is removed from the , pallet and transferred to a bottle 3 which is rotating on a carriage 2. Shortly before the bottles arrive at a pocket of the outfeed starwheel 53, the centering bell is raised from the mouth of the bottle so that the bottle 3 can be transferred from the rotary table 1 onto an outfeed conveyor 54.

As is further indicated in FIG. 1, each bottle carriage 2 can have a controllable blocking element 26 that rotates with the rotary table 1 and which can be displaced radially in the direction of the carriages 2 by means of a stationary control cam 27 near the labeling zone and can be brought into contact with a depression in a plate of the carriage. This assures that the label will be seated exactly where it should be without any existing play in the control arrangement of the plate on which the bottle is supported in the carriage. For the sake of brevity and clarity, only one set of blocking elements 26 has been depicted in the drawing.

Figure 2:
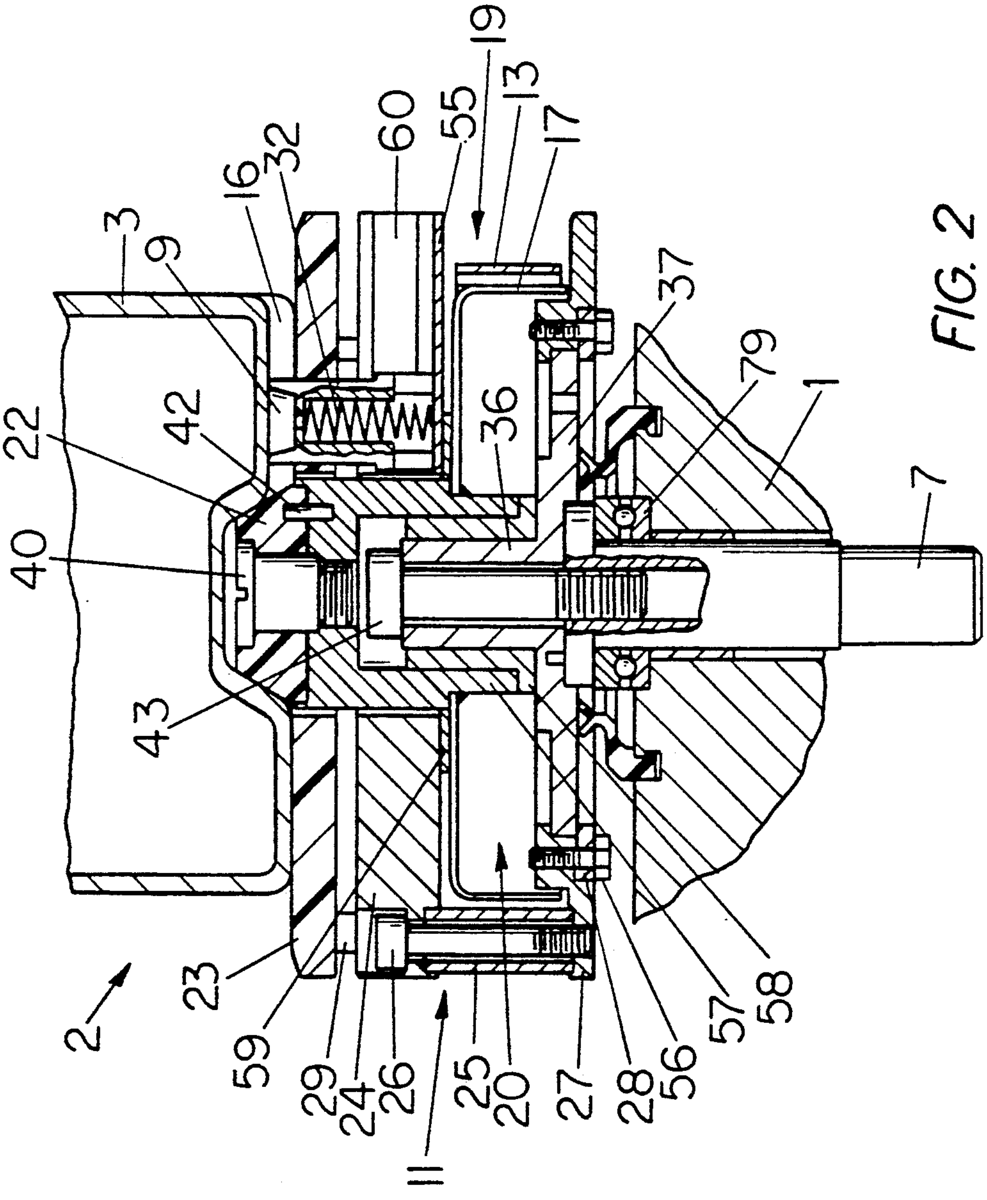
FIG. 2 is a vertical section through a bottle supporting carriage and a part of the rotary table housing taken on a line corresponding with 2—2 in FIG. 4.

Attention is now invited to FIG. 2. It shows just a fragment of the rotary table 1 and one of the carriages The bottle 3 stands on a support disk 23. The device includes a control shaft 7 on which there is a cam follower, not shown, which engages in a cam groove, not shown. It is sufficient to say that the control shaft 7 is supported so as to rotate about a vertical axis in a bearing 79 in rotary table 1. Elements in the carriage are uncoupled from shaft 7 while the bottom is in the alignment zone 18. The bottles are rotated continuously after they leave the centering and aligning zone and until they arrive in the outfeed starwheel 53.

A mounting plate 37 is fastened to control shaft 7. Plate 37 is fixed against rotational and vertical movement relative to the shaft by means of an axial screw 43 which extends through a bore hole of a journal 36. The journal 36 is formed unitarily with the mounting plate 37. Journal 36 rotatably supports a sleeve 57 by means of a flange bushing 58. Sleeve 57 supports a truncated conical centering element 22 on its upper end. The conical element 22 is fastened by means of a locking screw 40 to a sleeve-like body 67. To avoid rotation of the cone-shaped centering element 22 when it is transmitting torque, the centering element is locked with respect to sleeve 57 by means of a pin 42. Mounting plate 37 is prevented from rotating relative to control shaft 7 by means of a dowel pin. The outside diameter of locking screw 40 is such that, after it is removed, the screw 43 beneath it can be loosened without disassembling other parts of the device so that the entire device can be rapidly exchanged for another if it were damaged.

Figure 3:
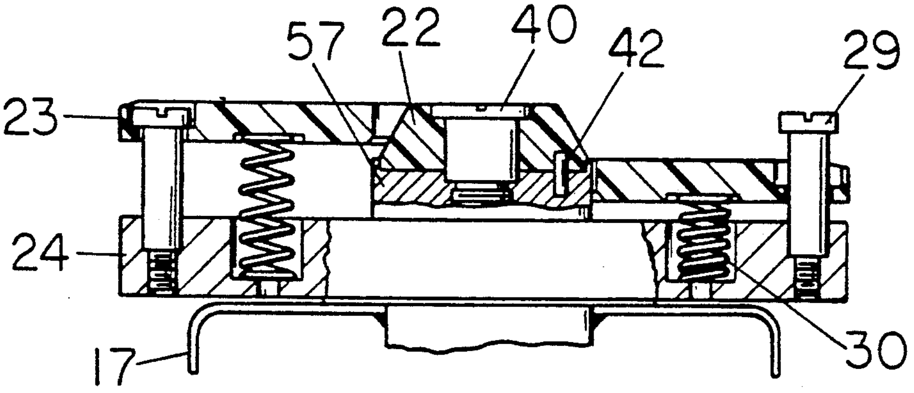
FIG. 3 is a vertical section taken through the upper part of a bottle carriage which includes the bottle support plate, the section being taken along the line 3—3 in FIG. 4.
Figure 4:
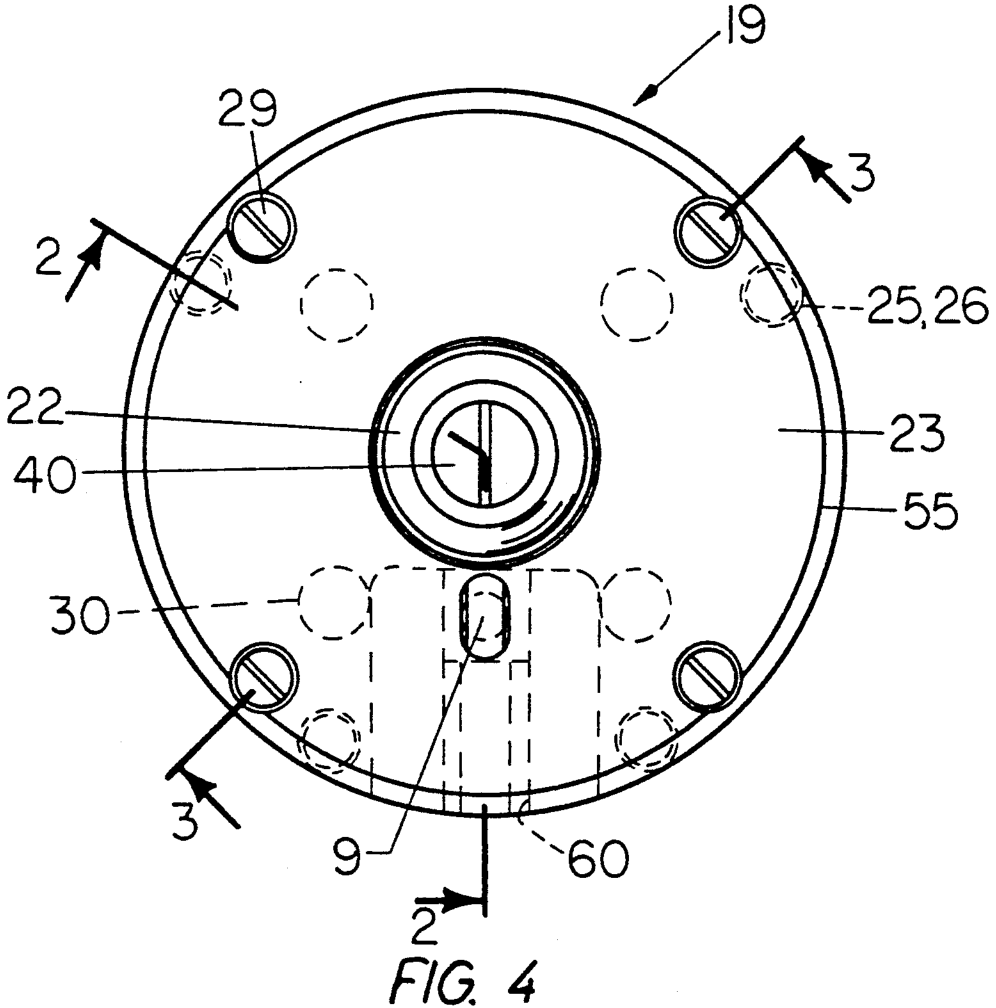
FIG. 4 is a top plan view of the bottle supporting plate in a typical bottle carriage.

A bearing ring 27 is fastened to the outer circumference of the mounting plate 37 by means of a clamping ring 28. The bearing ring supports a ring plate 24 which is rigidly connected to the bearing ring 27 by means of tubular spacers 25 and screws 26 that extend through the spacers The assembly which includes support plate 37, bearing ring 27, spacers 25 and ring plate 24 has an internal hollow space 20 in which a friction body in the form of an inverted u-shaped friction driven wheel 17 is arranged The friction wheel is driven by friction belt 13 when the bottle carriage is in alignment zone 18. The friction wheel 17 is fastened to the sleeve 57 which supports the truncated cone-shaped centering element 22 and, together with it, is thereby freely rotatable with respect to control shaft 7. Friction wheel 17 is fixed against axial movement by means of a thrust washer 56 located between friction wheel 17 and ring plate 24. The periphery of friction wheel 17 fits with little clearance relative to the spacers 25. Recesses extend laterally between the spacers 25, thereby allowing friction drive belt 13 to pass through laterally to frictionally engage wheel 17. As is evidenced in FIG. 4, spacers 25 are arranged asymmetrically along the circumference of bearing ring 27 so a particularly wide side opening 19 is created for friction belt 13 to reach and press against friction wheel 17 to cause the conical centering element 22 to rotate and thereby rotate the bottle 3. The speed ratios are such that the bottle may rotate a few times while it is passing through the centering zone 18 to assure that the centering element 9 will latch into bottom groove 16 before the carriage 2 leaves the zone. As can be seen particularly well in FIG. 3, four flange bolts 29 are fastened in ring plate 24 which serve to axially guide a bottle support disk 23 which is in the nature of a ring and has a central opening which is a little larger diametrically than the largest diameter of conical centering element 22. The bottle 3 is pressed against bottle support disk 23 under the influence of the centering bell which is not shown. Four symmetrically arranged compression springs 30 are interposed between ring plate 24 and the bottle support disk 23. Springs 30 continuously exert a force on bottle support disk 23 to urge the support disk 23 into its upper stop position as is demonstrated in the left half of FIG. 3. The upper stop position is established by the heads of the four flange bolts 29 and the depressions on the upper side of bottle support disk 23. When no bottle is standing on bottle support disk 23 the disk is elevated and stopped in its uppermost position as illustrated in the left half of FIG. 3. When a bottle is pressed down onto support disk 23 by means of a centering bell, not shown, that is vertically controlled and engages the bottle at its mouth the parts assume the positions in which they are depicted in the right half of FIG. 3. Thus, when a bottle is deposited on support disk 23 the conical centering element 22 registers in the cone-shaped recess in the bottom of the bottle. At this time the upwardly spring biased alignment element 9 which is shown in FIG. 2 is simultaneously depressed or lowered by means of the bottle bottom, unless, by chance, the element 9 would enter the radially extending groove 16 in the bottle bottom without the bottle having been rotated. Whether or not the alignment element 9 registers in groove 16 of the bottle, at this time the bottle is moving through the alignment zone 18 in FIG. 1 and the bottle is being rotated a few times by the friction belt 13 engaging the friction drive wheel 17. When the alignment element 9 registers in groove 16, the bottle is locked against further rotation under the influence of conical centering element 22. When the device with a bottle on it is passing through the alignment zone 18, bottle support disk 23 is held stationary with respect to the housing of the rotary table by means of control shaft 7. In FIG. 2, the alignment element 9 has registered in radially extending groove 16 in the bottle bottom.

The alignment element 9 is supported in the ring plate 24 such that it can be axially displaced and extends through a suitable opening in bottle support disk 23 which simultaneously serves as a guide for alignment element 9 Alignment element 9 is supported between two limit or stop positions such that it can be displaced axially and is continuously acted on by spring 32 which forces the element to its upper stopped position. The upper stopped position is established by an abutment surface on the lower end of the alignment element 9 and a counter surface in the ring plate 24.

Since the alignment element 9 is subject to much wear, a guide piece 60 is provided in the ring plate 24 to facilitate rapid exchange of the alignment element. The cross-section of the guide 60 matches the outer contour of the alignment element 9 in such a way that when the alignment element is lowered after reaching the lowered stop position, the alignment element can be pushed out radially by hand whereby it is held at its lower stop position by means of the guide 60 which is formed for this purpose on its abutment surface. In this way, the alignment element 9 can be disengaged from the recess in the bottle support ring 23 without difficulty and can be pushed out radially under it whereby, at the same time, the spring 32 that is integrated in the alignment element 9 is also removed. moved. The placement of a new alignment element 9 occurs in the reverse sequence. The guide piece 60 in the ring plate 24 is closed on its lower end by means of a sheet metal plate 55.

To adjust the position of the alignment element 9 with respect to the cam groove, not shown, of the control arrangement, the assembly 11 and the ring plate 24 can be precisely adjusted by rotating the bearing ring 27 with respect to mounting plate 37 and the position that is reached is secured by tightening the clamping ring 28 by means of the screw 56.

I claim:

1. Apparatus for aligning bottles in a preselected angular position, said bottles having a conical recess and a groove displaced from said recess in their respective bottoms, comprising:

a rotary table for rotating about a vertical axis and a plurality of shafts arranged in a circle about said axis for orbiting with the table, each of said shafts having a bottle carriage mounted thereon including;

a conical bottle centering element and means supporting said element for rotating concentric to the shaft, said element having a shape which is substantially complementary to said conical recess in the bottom of the bottles for registering in said recess, a bottle support disk having a central opening concentric to said conical centering element and means for guiding said bottle support disk for moving downwardly and upwardly relative to said conical centering element between upper and lower limits, spring means for urging said bottle support disk toward its upper limit wherein it is substantially flush with said conical bottle centering element such that when a bottle bottom is pressed downwardly on said bottle support disk in opposition to said spring means said support disk lowers to provide for said conical centering element registering in said conical recess for driving said bottle rotationally, an alignment element and a spring for pressing said element into contact with the bottom of the bottle when said bottle supporting disk is pressed toward said lower limit, a friction wheel means connected to said conical centering element and rotatable about the axis of said shaft, and a friction element positioned adjacent said rotating table in a bottle alignment and centering zone for frictionally engaging said friction wheel to rotate said conical centering element until said alignment element latches in said groove in the bottle to hold said bottle in a predetermined angular position.

2. The device according to claim 1 wherein said friction element is a belt.

3. The device according to any one of claims 1 or 2 including a ring plate fixed relative to said shaft against axial and rotational movement underneath said bottle support disk, and wherein said guide means for upward and downward movement of said bottle support disk are a plurality of bolts which have a cylindrical body, a head on one end of the body and a thread on the other end of the body, said thread being screwed into said ring plate and the body of the bolts passing through clearance holes in said bottle support disk, said bottle support disk thereby being interposed between said heads and said ring plate, the aforesaid springs which urge said bottle support ring upwardly being interposed between said bottle support disk and said ring plate and said heads serving to stop said bottle support disk at its upward limit.

4. The device according to claim 3 wherein said springs are compression springs.

5. The device according to claim 1 wherein said alignment element is supported for moving between lower and upper stop positions and said spring which presses said alignment element into contact with the bottom of said bottle causes the alignment element to project through and above said bottle support disk.

6. The device according to any one of claims 1 or 2 including:

a mounting plate fixed to said shaft, a ring plate mounted to the shaft in spaced relation therewith such that said ring plate and said mounting plate define an open sided space and said friction wheel means is arranged in said space.

7. The device according to claim 6 wherein there is at least one spacer between the mounting plate and the ring plate.

8. The device according to claim 7 wherein said spacer is a tubular body.

9. The device according to claim 6 including a bearing ring to which said ring plate 24 is rigidly attached, and a clamping ring for clamping said bearing ring to said mounting plate.

10. The device according to any one of claims 1 or 2 including a mounting plate fastened to said shaft, a ring plate axially spaced above said mounting plate and bolts interconnecting said ring plate to said mounting plate with spacers between said plates to maintain the plate axially spaced apart, a journal extending axially from said support plate and a bushing having a bore fitted on said journal and having an outside bearing surface, a sleeve rotatable on said bushing and said conical centering element being mounted to said sleeve, including means for prohibiting said centering element from rotating relative to said sleeve, said friction wheel means being mounted to said sleeve in the space between said mounting plate and said ring plate.

11. The device according to claim 10 wherein in said alignment element is guided for moving vertically in said ring plate and said spring for pressing said alignment element toward said bottle support ring is in a bore within said alignment element.

* * * * *